United States Patent [19]

Quinn

[11] Patent Number: 4,790,137
[45] Date of Patent: Dec. 13, 1988

[54] AIRCRAFT ENGINE OUTER DUCT MOUNTING DEVICE

[75] Inventor: Ronald E. Quinn, Hamilton, Ohio

[73] Assignee: The United States of America as represented by the Secretary of the Air Force, Washington, D.C.

[21] Appl. No.: 74,802

[22] Filed: Jul. 17, 1987

[51] Int. Cl.[4] .................... F02K 3/04; F02C 7/20
[52] U.S. Cl. .................. 60/226.1; 60/39.32; 415/134; 415/138
[58] Field of Search ............ 60/39.32, 226.1, 262, 60/39.31; 138/112, 113, 114; 285/133.1, 138, 187, 905; 248/DIG. 1; 415/134, 136, 138, 139, 142

[56] References Cited

U.S. PATENT DOCUMENTS

| | | | |
|---|---|---|---|
| 1,122,130 | 12/1914 | Lamson | 138/113 |
| 2,693,371 | 11/1954 | Nelson | 60/39.32 |
| 2,936,108 | 5/1960 | Balcom et al. | |
| 2,942,844 | 6/1960 | Neate | |
| 3,169,576 | 2/1965 | Lee et al. | 138/113 |
| 3,750,983 | 8/1973 | Morris | 60/226.1 |
| 3,759,038 | 9/1973 | Scalzo et al. | 60/39.32 |
| 3,835,240 | 9/1974 | Matthäus | 138/113 |
| 3,843,279 | 10/1974 | Crossley et al. | 415/191 |
| 3,901,622 | 8/1975 | Ricketts | 415/134 |
| 4,452,038 | 6/1984 | Soligny | 60/39.32 |

FOREIGN PATENT DOCUMENTS

| | | | |
|---|---|---|---|
| 853134 | 11/1960 | United Kingdom | 60/39.32 |
| 1505578 | 3/1978 | United Kingdom | 138/112 |

*Primary Examiner*—Donald E. Stout
*Attorney, Agent, or Firm*—Donald J. Singer; Jules J. Morris

[57] ABSTRACT

The invention comprises a mounting assembly for supporting the turbine outer casing duct adjacent to the turbine frame. Multiple support posts are mounted to the turbine frame and a roller means is rotatably attached to each support post. The roller means are aligned to rotate on a contact surface of the outer casing duct. Movement of the rollers on the contact surface is caused by the relative movement of the turbine frame and outer casing duct.

10 Claims, 1 Drawing Sheet

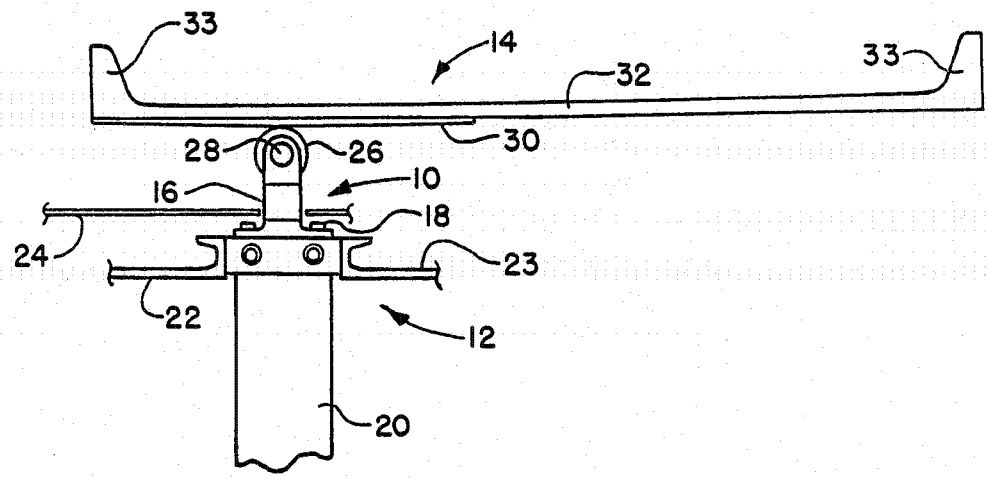

AIRCRAFT ENGINE OUTER DUCT MOUNTING DEVICE

STATEMENT OF GOVERNMENT INTEREST

The invention described herein may be manufactured and used by or for the Government for governmental purposes without the payment of any royalty thereon.

TECHNICAL FIELD

This invention relates to turbofan engines and specifically to a mounting device for supporting an engine outer casing duct relative to the engine turbine section.

BACKGROUND OF THE INVENTION

Modern turbofan engines typically comprise assemblies having inner and outer casings or ducts. Multiple casings are required because these engines make use of an inner airflow, that passes through a compressor and a turbine, and an outer airflow, that passes through a fan or low pressure compressor and then bypasses the engine turbine. These two airflows are typically reunited in the engine exhaust. In order to support these two separate airstreams inner and outer casings are maintained through a large portion of the engine.

The outer casing, or duct, is generally supported by links connecting to the inner casing or the engine frame. One method of supporting the outer casing in conventional engines is by using several pin ended links. Such links (or alternatively turnbuckles) require mounting brackets at both their inner end, which is connected to the turbine frame, and their outer end, which is connected to the outer casing duct.

These links have been provided to allow for a limited amount of relative movement between the turbine frame and the outer casing duct. Limited movement must be allowed to accommodate differential thermal expansion of the outer casing duct relative to the turbine frame. The turbine frame generally reaches much higher temperatures during engine operation than the outer casing duct, since the turbine airflow is quite hot after passing through the combustor. The temperature difference between the inner and outer airflows and the different geometry of the ducts results in differential thermal expansion.

This type of mounting arrangement has been successfully used for many years in conventional turbofan aircraft engines. The incorporation of new materials into aircraft engine ducting has created new linkage problems that can not be easily accommodated by conventional assemblies. New exhaust casing duct designs and geometries have made the incorporation of conventional link support devices more difficult. Further, newer engines have been designed to run at elevated operating temperatures, as a result, relative thermal expansion is a larger problem than in older engines.

Many composite materials such as polymide graphite, carbon-carbon and graphite epoxys, which have a much lower coefficient of thermal expansion than the conventional metallic casings, are now being incorporated into outer casing ducts because of their high strength and low weight. Metallic core engine turbine casings and frames typically undergo expansion in the aft and radial direction to a larger degree than composite fan casings. A conventional pin ended link support system between a turbine frame and a composite outer casing duct will operate in compression in all engine operating conditions with greater loads superimposed during flight maneuver accelerations. Excessive compression loads caused by differential thermal expansion result in hardware cracking and deformation.

A further problem with conventional link support systems is the need to attach and detach each link during every installation and removal of the outer duct. This is a tedious operation that is required each time maintenance is performed on the aft engine core. It would be advantageous if a time saving means was devised for removing the outer duct in order to speed up and simplify engine maintenance.

A need therefore exists for an improved outer casing duct support mechanism that can accommodate use of composite materials in new technology turbofan engines.

A further need exists for a turbine outer case mounting device which will facilitate easy removal of the engine outer casing duct.

SUMMARY OF THE INVENTION

In the preferred embodiment of the invention the mounting assembly for supporting the turbine outer casing duct adjacent to the turbine frame comprises support posts mounted to the turbine frame. A roller means is rotatably attached to each support post and is aligned to rotate on a contact surface of the outer casing duct. Movement of the roller on the contact surface is caused by the relative movement of the turbine frame and outer casing duct.

BRIEF DESCRIPTION OF THE FIGURE

The foregoing and other objects and advantages of the invention will be apparent from the following more particular description of the preferred embodiment of the invention, as illustrated in the accompanying drawing. The drawing is not necessarily to scale, emphasis instead being placed upon illustrating the principles of the invention.

The figure is a cross sectional view of a portion of an aircraft engine incorporating the mounting device of this invention.

DETAILED DESCRIPTION OF THE INVENTION

An aircraft engine outer duct mounting assembly 10 incorporating the principles of this invention is shown in the Figure. An outer duct 14 is mounted by several identical mounting assemblies 10 positioned circumferentially around the generally cylindrical engine core. They provide a support mounting and thermal accommodation means between the metallic turbine frame assembly 12 and the composite outer casing duct 14. The outer casing duct is sometimes also referred to as the fan casing. A single mounting assembly 10 is shown in the figure, however, it should be understood that several such assemblies are used, all of which are identical.

The mounting assembly 10 is affixed to the turbine frame 12 which forms a part of the engine's inner duct. The inner duct also comprises inner duct segments 22 and 23 which are affixed to a turbine frame support strut 20. The core engine inner casing ducts 22, 23 form an outer flow path for the high temperature core engine airflow air that travels through the turbine engine's combustion chamber and turbine. For aerodynamic purposes a turbine fairing 24 is also assembled to the turbine frame. Both the fairing and inner duct casing are fixedly attached to the turbine frame and there is little or no relative movement therebetween.

The mounting assembly 10 comprises a support post 16 which is fastened with rivets or bolts 18 to the turbine frame support strut 20 of the inner, or core engine, casing. A roller 26 is mounted on a rotatable axle 28 to the end of the support post 16. The roller will rotate with any relative movement between the turbine frame assembly 12 and the outer casing duct 14. The roller 26 is maintained in contact with a roller track 30 that is affixed to outer casing duct segment 32.

The outer casing 14 comprises roughly cylindrical or polygonal segments 32 that are bolted together with bolt circles at flanges 33. Typically, the casing duct 14 is manufactured from a composite material such as polymide graphite, carbon-carbon, or graphite-epoxy. These are lighter and stronger than most of the metallic materials they have replaced and are also capable of withstanding the moderately high temperatures of the outer duct. As a result of the use of non-metallic materials for the outer casing ducts, significant relative movement between the turbine frame and the outer casing duct will occur due to the different operating temperatures of the two components and their disparate coefficients of thermal expansion. The metallic turbine frame will expand more at engine operating temperatures than the non-metallic casing duct which is generally at a somewhat lower temperature and has a lower coefficient of thermal expansion.

Roller track 30, affixed to outer duct 32, is preferably manufactured from a hard flexible metallic material so that it can withstand and spread the compression forces transmitted through the support post and roller of mounting assembly 10. Radial and axial thermal compensation is provided by the metallic roller rolling against the metallic track 30 mounted on the outer casing duct. The track 30 is tapered in both the forward and aft directions from the cold assembly position (as shown) of the roller against the track. The tapered track 30 is used both to preload the rollers and to control compressive forces during engine operation.

When the outer duct is assembled over the turbine frame it is slid over the inner duct and the rollers (26) contact the tapered tracks (30) which gently compress the mounting assemblies in order to tightly hold the outer duct. The tapered angle at the forward end (left side of Figure) of the roller track is used to preload the rollers and their support posts in compression during assembly of the outer duct 14 to the turbine frame 12. During engine operation the inner duct (turbine frame) carrying the support post 16 expands axially and radially relative to the outer duct. In order to prevent excessive build-up of compressive stress due to differential thermal expansion in the radial direction, the track 30 is tapered to increase the distance between the turbine frame and the track as the turbine frame moves axially aft (to the right in the Figure). The tapering of the roller track thus enables the compression on the roller and post to be maintained at a preferred level during all operating and non-operating conditions. Further, it makes for easy assembly of the outer casing duct to the turbine frame since the duct is simply slid against the rollers into position.

The mounting system of this invention contrasts with the conventional pin ended link support system in which the links operate in compression at all operating conditions and excessive build-up of compressive forces can occur due to the differential thermal expansion in the radial direction of the the turbine frame relative to the outer casing duct.

Several other advantages also stem from the use of the mounting device of this invention. All the brackets and fittings required for installing links on the outer casing duct are completely eliminated. Most of these brackets and fittings typically would be on the outer side of the outer casing duct. Use of the roller system allows more nearly idealized localized polygonalization on the fan casing duct. This is because the circumferentially flattened areas of the outer casing duct which have been required for outer link support brackets can be substantially reduced for the attachment of the roller track 30. These flattened areas can also be reduced in older style engines having cylindrical and conical ducts. It may also be possible to produce rollers and tracks which conform to the desired shaping of the outer casing duct.

Yet another advantage of this invention stems from a reduction of the number and size of penetrating holes and slots in the outer casing duct that results from the elimination of link fittings and brackets. This reduction in penetrating holes and slots allows for reduction in required duct reinforcement. Further, the removal of the support bracket and fittings reduces duct weight as well as height projections as compared to the conventional link outer support bracketing systems.

Finally it should be noted that the use of the roller and track assemblies allow for improved accessibility of core engine parts within the fan duct by eliminating the need for removing link pin retainers before removing the casing duct from over the turbine frame. All that is now required is removal of bolts from an outer casing bolt circle and sliding the duct off the support rollers.

While the invention has been particularly described with reference to the preferred embodiment thereof, it will be understood by those skilled in the art that various changes in substance and form can be made therein without having departed from the spirit and the scope of the invention as detailed in the attached claims.

I claim:

1. A mounting assembly for a turbofan engine having inner and outer casings comprising:
    (a) a support post mounted on the inner casing;
    (b) roller means attached to said support post; and
    (c) a contact surface comprising a tapered roller track attached to said outer casing wherein said roller means contacts said outer casing at said contact surface and moves in motion between said inner and outer casings and wherein said roller track has a minimum radial dimension relative to the engine centerline coinciding with a non-operating position of said roller means and is tapered to a larger radial dimension, in the axial direction, in order to compress said roller means with a desired force during operation of the turbofan engine.

2. The mounting assembly of claim 1 wherein said roller means comprises a roller rotatably mounted to said support post so that during relative movement of said inner and outer cases said roller rolls along said contact surface.

3. The mounting assembly of claim 1 wherein said outer casing comprises a non-metallic material.

4. The mounting assembly of claim 1 wherein said roller track is constructed of metal.

5. The mounting assembly of claim 1 wherein said inner casing comprises a turbine engine core casing and a turbine frame support.

6. The mounting assembly of claim 5 wherein said support post is affixed to said turbine frame support.

7. A mounting assembly for supporting an engine outer casing relative to a turbine frame comprising:
 (a) a support post mounted on the turbine frame;
 (b) roller means rotatably attached to said support post; and
 (c) a tapered contact surface attached to said engine outer casing wherein said roller means contacts said engine outer casing at said contact surface which has a minimum radial dimension relative to the engine center line coinciding with the roller means non-operating position and is tapered to a larger radial dimension in the axial direction in order to accommodate relative thermal growth of said turbine frame and the engine outer casing during engine operation.

8. The mounting assembly of claim 7 wherein said engine outer casing comprises a non-metallic material.

9. The mounting assembly of claim 7 wherein said contact surface is constructed of metal.

10. The mounting assembly of claim 8 wherein said contact surface is tapered axially forwardly to a larger radial dimension to ease assembly of the engine outer duct to the turbine frame.

* * * * *